(12) United States Patent
Lerner et al.

(10) Patent No.: US 9,237,140 B1
(45) Date of Patent: Jan. 12, 2016

(54) ACCEPTANCE OF POLICIES FOR CROSS-COMPANY ONLINE SESSIONS

(71) Applicant: Cisco Technology, Inc., San Jose, CA (US)

(72) Inventors: Eric Lerner, Alameda, CA (US); Isaac Eleftheriadis, San Francisco, CA (US); Ruixiang Ray Liu, Sunnyvale, CA (US); Ming He, San Jose, CA (US)

(73) Assignee: Cisco Technologies, Inc., San Jose, CA (US)

(*) Notice: Subject to any disclaimer, the term of this patent is extended or adjusted under 35 U.S.C. 154(b) by 174 days.

(21) Appl. No.: 13/788,638

(22) Filed: Mar. 7, 2013

(51) Int. Cl.
*G06F 17/00* (2006.01)
*H04L 29/06* (2006.01)

(52) U.S. Cl.
CPC .................................. *H04L 63/08* (2013.01)

(58) Field of Classification Search
CPC .............................. H04L 63/20; H04L 63/102
USPC ............................................................. 726/1
See application file for complete search history.

(56) References Cited

U.S. PATENT DOCUMENTS

| | | | |
|---|---|---|---|
| 7,685,630 B2 | 3/2010 | Thapliyal et al. | |
| 8,713,688 B2* | 4/2014 | Wahl et al. | 726/26 |
| 2011/0166950 A1* | 7/2011 | Goldstein et al. | 705/26.3 |
| 2012/0095894 A1* | 4/2012 | Campbell et al. | 705/35 |
| 2013/0018950 A1 | 1/2013 | Narayanan et al. | |

* cited by examiner

*Primary Examiner* — Anthony Brown
(74) *Attorney, Agent, or Firm* — Edell, Shapiro & Finnan, LLC

(57) ABSTRACT

A user associated with a first organization is authenticated, via a meeting server, for participation in an online session hosted by a second organization. It is determined, via the meeting server, that the first organization requires the user to accept a first policy. It is also determined, via the meeting server, that the second organization requires the user to accept a second policy. The first policy and the second policy are presented to the user for acceptance.

20 Claims, 6 Drawing Sheets

ACCEPTANCE OF POLICIES FOR CROSS-COMPANY ONLINE SESSIONS

TECHNICAL FIELD

The present disclosure relates to online sessions, and in particular, the acceptance of terms necessary to join online sessions.

BACKGROUND

Online sessions, including web conferencing, video conferencing, and integrated web and video conferencing, are services that allow geographically distributed teams to share and annotate content real-time across remote locations. The services allow real-time point-to-point communications as well as multicast communications from one sender to many receivers. The services may also provide text-based messages, as well as voice and video chat to be shared simultaneously across geographically dispersed locations. Applications for web conferencing include meetings, training events, lectures, or short presentations from any computer.

Online session may also include online collaborative sessions, often between parties seeking to protect their intellectual property rights in any content shared during a session. In order to ensure protection of intellectual property, parties may enter into agreements, binding the participants to keep information exchanged during the collaborations confidential.

DESCRIPTION OF EXAMPLE EMBODIMENTS

Overview

A user associated with a first organization is authenticated, via a meeting server, for participation in an online session hosted by a second organization. It is determined, via the meeting server, that the first organization requires the user to accept a first policy. It is also determined, via the meeting server, that the second organization requires the user to accept a second policy. The first policy and the second policy are presented to the user for acceptance.

Example Embodiments

Presented herein are techniques that enable meeting participants to explicitly accept all relevant legal terms prior to participating in a real-time collaboration session across organizations. Prompts are displayed to a meeting participant for acceptance of the legal terms required his own (first) organization as well as the (second) organization of the person that is "hosting" the meeting. Absent this explicit acceptance, the user may not be allowed to proceed into the meeting. No relationship between the first and second organizations needs to exist in order for this collaboration to happen. The meeting server brokers the entire transaction on behalf of the meeting participants. For simplicity, a meeting participant is also referred to herein as a user.

Figure 1:
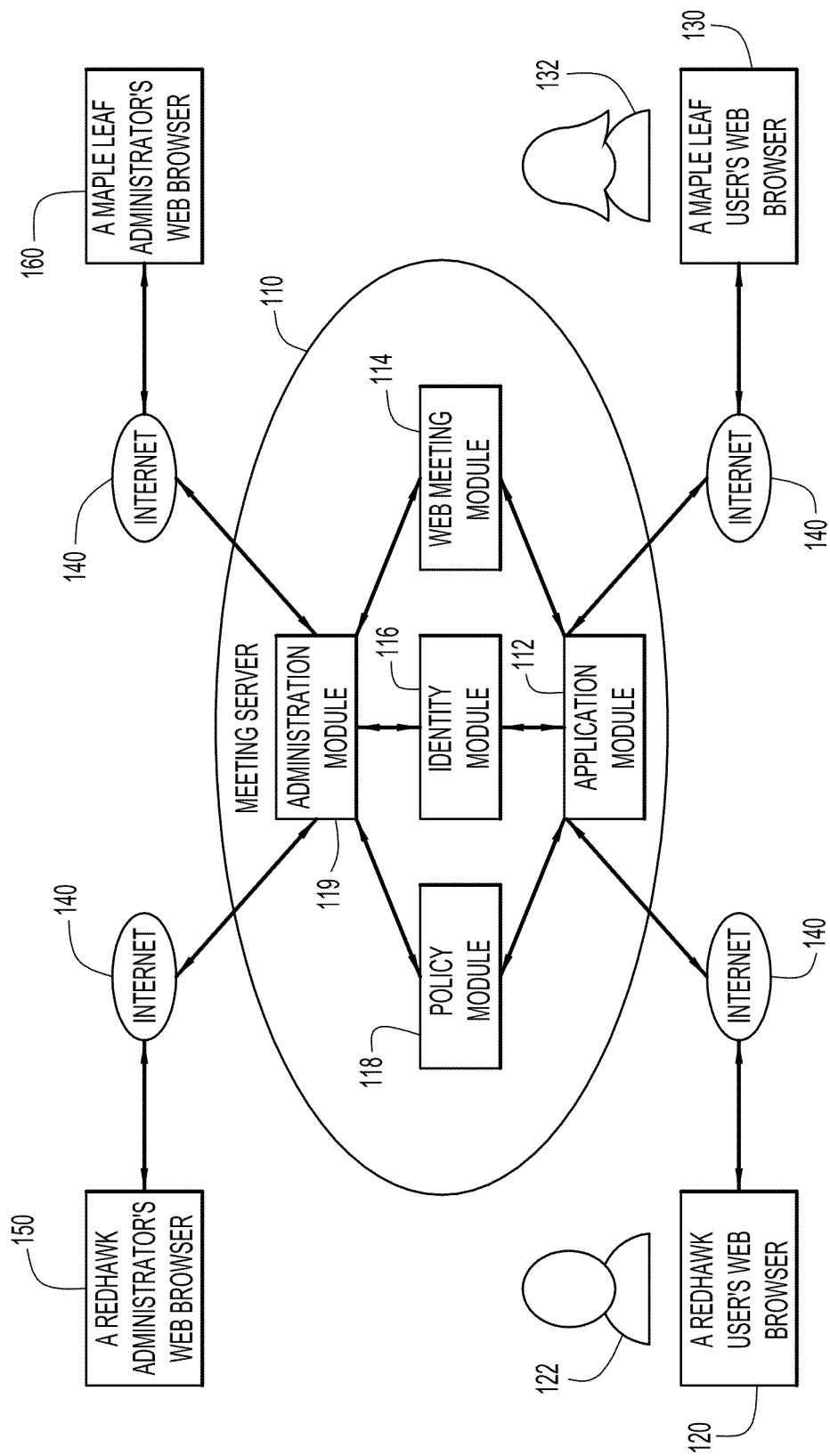
FIG. 1 is a block diagram illustrating a system configured to provide acceptance of policies for online sessions.

Depicted in FIG. 1 is an architecture diagram of a system configured to providing online sessions, such as web-based meetings, between meeting participants across a plurality of organizations, including the ability to present a plurality of policies to the meeting participants. The plurality of organizations may be different corporations or business entities, each of which has its own set of policies. Examples of policies may include terms of service (ToS) for the session software, privacy policies, non-disclosure agreements, and confidentiality agreements.

An online meeting server 110 provides a service that allows remote users to establish and conduct meetings using a web browser, mobile application, or similar software functions on an endpoint or similar device. As used herein, "server" may refer a single server, multiple servers, and/or one or more server farms. Accordingly, meeting server 110 may be embodied in a single server, a cluster of servers, or even distributed across multiple data centers located in different areas throughout the globe.

A user's endpoint may be a desktop computer, laptop computer, mobile Smartphone, tablet computer, or other video conferencing endpoint device. FIG. 1 shows a browser 120 for a first user 122 associated with a first organization and a browser 130 for a second user 132 associated with a second organization. In the example of FIG. 1, the first organization is "Redhawk" and the second organization is "Maple Leaf". The browsers 120 and 130 connect to and communication with the online meeting server 110 through a network, such as the Internet 140. The meeting server 110 may be a physical server apparatus or hosted in a data center of a cloud computing environment. The meeting server 110 includes several software/functional modules: application module 112, web meeting module 114, identity module 116, policy module 118, and administration module 119. Through application module 112, users 122 and 132 are able to schedule a meeting, such as a real-time collaborative session. The application module 112 provides a user interface through which users 122 and 132 can collaborate before and after the real-time session as well. Web meeting module 114 provides voice, video and text communication services; document and desktop sharing services; remote computer access services and other services, that the browsers 122 and 132 access through application module 112.

In addition to web meeting module 114, online meeting server 110 manages identities, permissions, and policies through identity module 116 and policy module 118, respectively. Specifically, identity module 116 manages user identities, and maintains an association between the user and the organization with which the user is associated. In order to manage the user identities, identity module 116 may comprise a database of user profiles. The database may be queried to determine the associations between users and organizations. Policy module 118 manages the policies for the organizations to which the users are associated. For example, an organization may require its associated users to accept certain terms before allowing the user to join an online session, or meeting. Similarly, organizations may require that users associated with other organizations, e.g. employees of other organizations, accept certain terms before allowing them to participate in an online session initiated by members of their organization. These policies may be stored in a database that may be queried by the policy module 118 in order to present the policies for acceptance by users.

Accordingly, when a user, such as user 122 or 132, through their respective browsers 120 and 130 (or other similar software function) connects to meeting server 110, application module 112, identity module 116 and policy module 118 interact to ensure that the appropriate policies are presented to and accepted by the users before the users are granted access to an online session controlled by meeting module 114.

Administration module 119 allows administrators from different organizations, such as administrator 150 who is associated with the same organization ("Redhawk") as user 122, and administrator 160 who is associated with the same organization ("Maple Leaf") as user 132, to set the policies for their respective organizations or companies. Specifically, administrators 150 and 160 may connect meeting server 110 through a network, such as Internet 140, and set their respective policies through administration module 119. Identity module 116 and policy module 118 contain user and policy information for more than one organization. It is therefore possible for the application module 112 to display terms and policies for multiple organizations to users 122 and 132 when they connect to meeting server 110 through application module 112 and seek to participate in a meeting session. An example of displaying multiple terms and policies presented to a user will be described in more detail below with reference to FIGS. 2-4.

Figure 2:
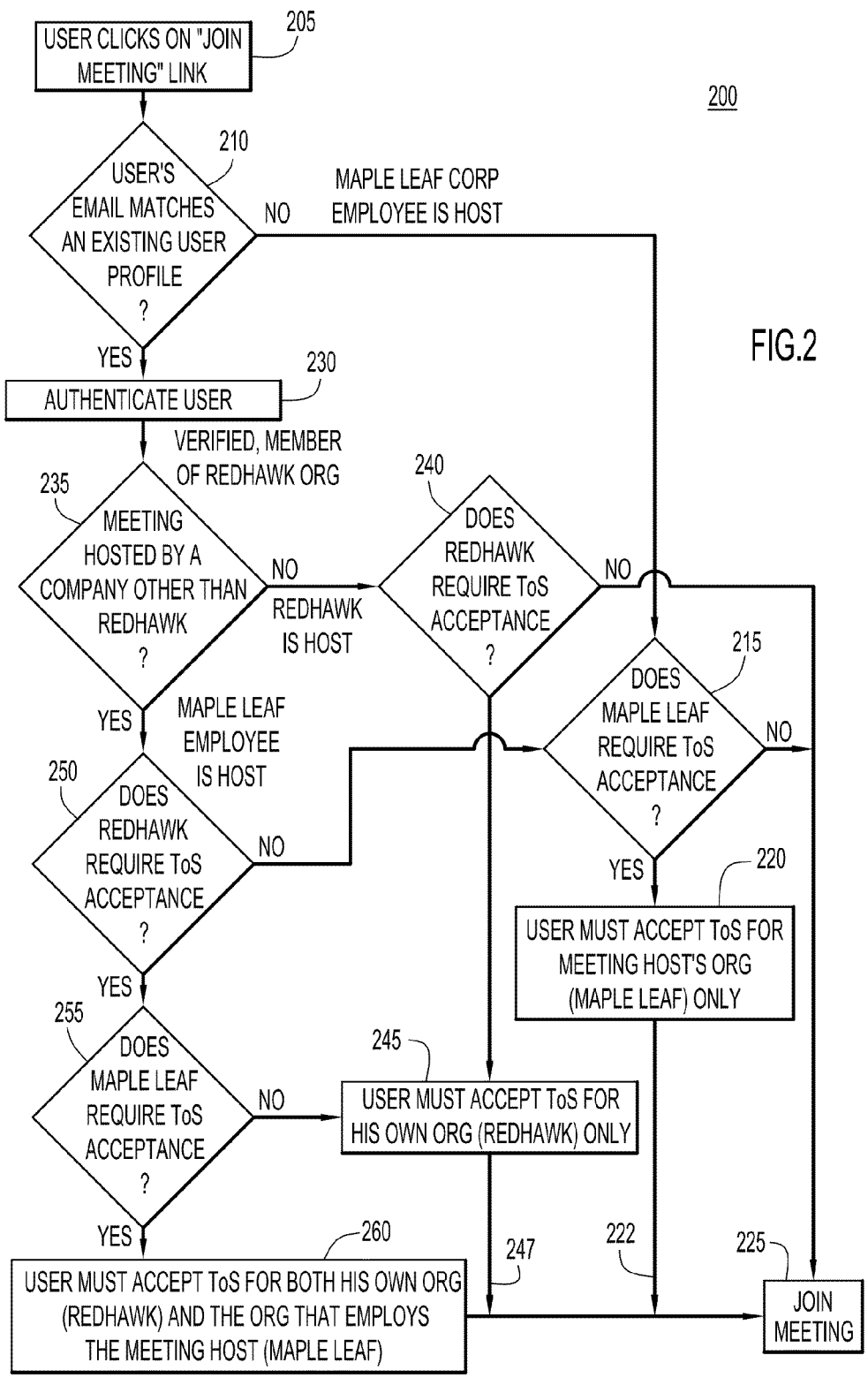
FIG. 2 is a flowchart illustrating a process for presenting and accepting policies required to join an online session.

With reference now to FIG. 2, depicted therein is a flowchart 200 showing a process through which a user would be granted access to an online session, such as a meeting or a real-time online-collaborative session.

The process begins in step 205 where the user attempts to join the online session served by a meeting server. At step 205, the user supplies an email address or other credentials and clicks a "Join Meeting" link in the web browser, or otherwise initiates a command at the user's endpoint to join a meeting. The processing moves to step 210 where a determination is made as to whether or not the user is known to the meeting server, specifically, it is determined whether or not the user's email address matches an existing user profile stored at the meeting server.

The determination at step 210 may be made by receiving the user's email address provided in step 205. The email address may then be passed to an identity module of the meeting server, where it is determined if the address matches a user profile. The user's account or profile indicates the user's identity and the organization(s) with which the user is associated. According to other examples, it may be determined that the user is known to the meeting server by examining the user's email address. Specifically, by reviewing the domain name of the user's email address, the identity module of the meeting server may determine whether or not the user is associated with a known organization. For example, if the user's email address ends in "@redhawk.com" the meeting server may be able to determine that the user is an employee of the organization Redhawk.

If it is determined that the user is not known to the online hosting session, the processing proceeds to step 215 where it is determined whether or not Maple Leaf, the organization hosting the online session, requires unknown session participants to accept policies, such as legal terms or terms of service, before joining the session. The determination may be made by a policy module of the meeting server. For example, a Maple Leaf administrator may have set specific policies for the sessions hosted by the organization Maple Leaf. These policies may include legal terms that must be accepted by all participants in sessions hosted by Maple Leaf, terms of service that are to be accepted by participants that are not associated with the Maple Leaf, or terms of service that must be accepted by members of Maple Leaf. In step 215, because the user is not known to the meeting server, the policies required for all users, unknown users and/or users not associated with Maple Leaf are the policies determined to be applicable to the present user in this example.

The process then moves to step 220 where the determined policies are displayed to the user as shown at 222. In step 220, the determined policies may be sent from the policy module to the application module ultimately for display to and acceptance by the user. If the user accepts the policies by interacting through the application module, the processing moves to step 225 where the user is granted access to participate in the online session.

On the other hand, if the user is a member of the Redhawk organization, it will be determined in step 210 that the user is known to the meeting server, and the processing proceeds to step 230. In step 230, the user is prompted to provide a password in order to ensure that they are in fact the user associated with previously supplied username or email address. Thus, step 230 serves to authenticate the user. According to other examples, the password may be supplied in step 210. The password may be received through the application module of the online session hosting system and supplied to the identity module for confirmation.

Having authenticated the password, the user is verified as a member of the Redhawk organization, and the process moves to step 235. At step 235 a determination is made as to whether the meeting the user wishes to join is being hosted by an organization other than Redhawk. In other words, it is determined if the meeting the user wishes to join is being hosted by the user's organization, or another organization known to the meeting server. As with the previous determinations, the determination made at step 235 may be made in the identity module of the meeting server.

If it is determined that the meeting is being hosted by Redhawk, the processing moves to step 240. In step 240, a further determination as to whether Redhawk requires the user to accept policies before joining the online session. In other words, a determination is made whether the hosting organization requires its own users, such as employees of the hosting organization, to accept policies before joining the online session. For example, it will be determined in step 240 if a Redhawk administrator has established policies in the meeting server that require Redhawk users and/or all users to accept terms of service before being given access to a meeting. As with the determination made in step 215, the determination made at step 240 may be made in the policy module of the meeting server. If it is determined that the user does not need to accept any terms or policies before joining the online session, the processing moves to step 225 where the user is granted access to the online session. On the other hand, if it is determined at 240 that the user needs to accept policies before joining the session, the processing moves to step 245.

In step 245 the determined policies are displayed to the user as shown at 247. In step 245, the determined policies may be sent from the policy module to the application module of the meeting server for display to and acceptance by the user. If the user accepts the policies by interacting through the application module, the processing moves to step 225 where the user is granted access to the online session.

At step 235, if it is determined that the meeting is hosted by an organization other than Redhawk, i.e. the user is associated with an organization other than the hosting organization, the processing moves to step 250. Even though the meeting is hosted by Maple Leaf, Redhawk is known to the meeting server. Accordingly, the meeting server is able to determine if Redhawk has established policies that its members must accept even if Redhawk is not the host for the meeting. Specifically, at step 250, a determination is made whether the user's organization, even though the user's organization is not hosting the meeting, requires the user to accept terms or policies before being granted access to a meeting. For example, a Redhawk administrator may have set up policies in the meeting server indicating that all Redhawk employees must accept terms of service and a privacy policy before joining any meeting even if the meeting is being hosted by an organization other than Redhawk.

As with the determinations made in steps 215, 235 and 240, the determination at step 250 may be made in the policy module of the meeting server. If it is determined that the user's organization does not require the user to accept policies, the processing moves to step 215, and follows the process as described above. If it is determined that the user's organization does require the user to accept policies, the processing moves to step 255.

In step 255, a further determination is made as to whether Maple Leaf requires the user to accept policies, such as terms of service, before joining the online session. In other words, a determination is made whether the hosting organization for the online session requires users associated with other organizations to accept policies before joining an online session. For example, a Maple Leaf administrator may have established a policy in the meeting server indicating that users not associated with Maple Leaf are required to keep all proprietary information discussed in the online session confidential. According to other examples, a Maple Leaf administrator may have established a policy indicating that all users, i.e. user associated with Maple Leaf as well as users associated with other organizations, must accept terms of service and a privacy policy before being granted access to a meeting.

The determination of step 255 may be made in the policy module of the online session hosting system. If it is determined that the hosting organization does not require the user to accept policies, the processing moves to step 245, and continues as described above. On the other hand, if it is determined that the hosting organization does require that the user accept policies before joining the meeting, the processing moves to step 260.

In step 260, the policies for both Redhawk, the user's organization, and Maple Leaf, the hosting organization, are presented to the user for the user's acceptance. If the user accepts the policies for both organizations, the processing moves to step 225 and the user is granted access to the online session.

According to the example of FIG. 2, the meeting server may be a service provided by an organization that is unrelated/not-affiliated with both the hosting organization and the user's organization. Because the meeting service is provided by a third party organization, the third party may act as a broker, independently ensuring enforcement of the participant organizations' policies.

Using a third party organization to maintain, manage and provide security for the online session allows multiple organizations to set their respective policies for the meeting service. According to other examples, if the meeting server is affiliated or run by an organization of a participant to the online session (as host or otherwise), the organization that is also associated with the meeting server may be reluctant or unable to allow access to other organizations administrators to set policies. Similarly, an administrator may be reluctant to access a competitor's meeting server due to security concerns regarding their policies. On the other hand, by using the third party organization to serve the online session, security of the host participants and other participants can be assured by the neutral third party. In other words, the third party server may provide a neutral ground for both Redhawk and Maple Leaf, where neither can override policies set by another organization, since it is the third party organization that ensures that all respective policies are enforced. For example, the third party organization will enforces policies and terms to Redhawk's own users on behalf of Redhawk, as well enforce Redhawk's policies to Maple Leaf's employees. Furthermore, the third party organization can provide a centralized meeting server that can ensure easy access to participants at a plurality of organizations. Specifically, the third party organization may be embodied in a cloud service/application provider that employs a multitenancy architecture, which services a plurality of client organizations.

Figure 3:
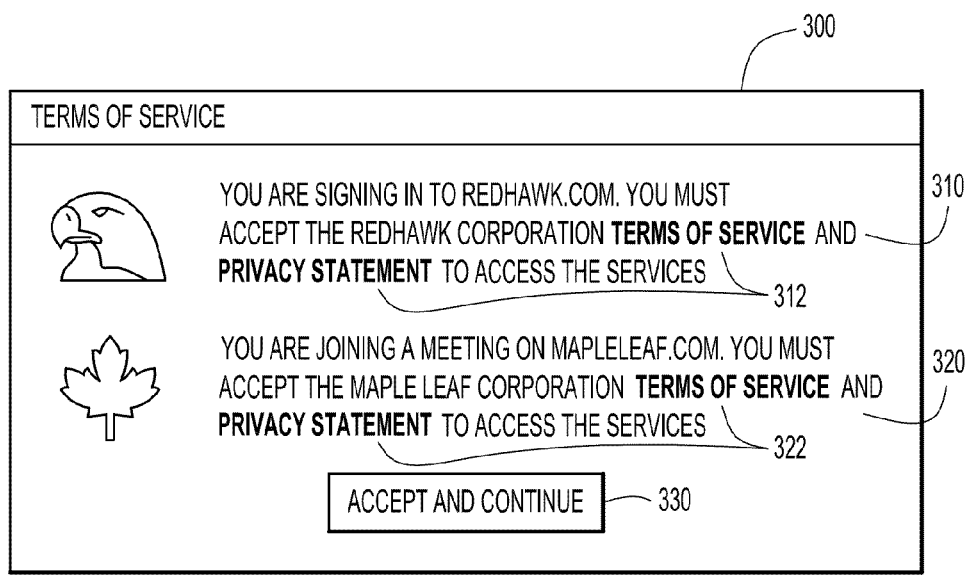
FIG. 3 is a depiction of a display screen used to present and accept policies required to join an online session.

With reference now to FIG. 3, depicted therein is an example display screen 300 which includes an indication of the terms of service 310 for the user's organization and an indication of the terms of service 320 for the hosting organization, both of which the user must accept before entering the online session. Display screen 300 may be presented on a user's web browser from data sent over a network from the meeting server. According to the example of FIG. 3, links 312 and 322 to the exact policies, in this case, terms of service and privacy policies, are presented in display screen 300 to allow the user to click those links and view the terms of service, and the user indicates his/her acceptance of the policies by clicking acceptance button 330. By clicking acceptance button 330, the user provides a single indication of acceptance for both sets of policies, and this acceptance which is received by the meeting server. According to other examples, the legal terms themselves may be displayed in text boxes in a display screen rather than require a user to click a link to view them. While the terms of service 310 and 320 are displayed simultaneously in display screen 300, other examples may involve displaying indications of the terms, or the terms themselves sequentially. For the example, the user may be prompted to accept the terms for the user's organization before accepting the terms for the hosting organization, or vice versa.

In display screen 300, there is a clear demarcation between the policies of the user's organization and the policies of the host's organization. According to other examples, the policies may be combined in a logical manner, such as by topic. Similarly, if the organizations utilize identical, or redundant policies, the policy module may remove redundant polices, ensuring that a concise set of policies is displayed for the user's acceptance.

Figure 4:
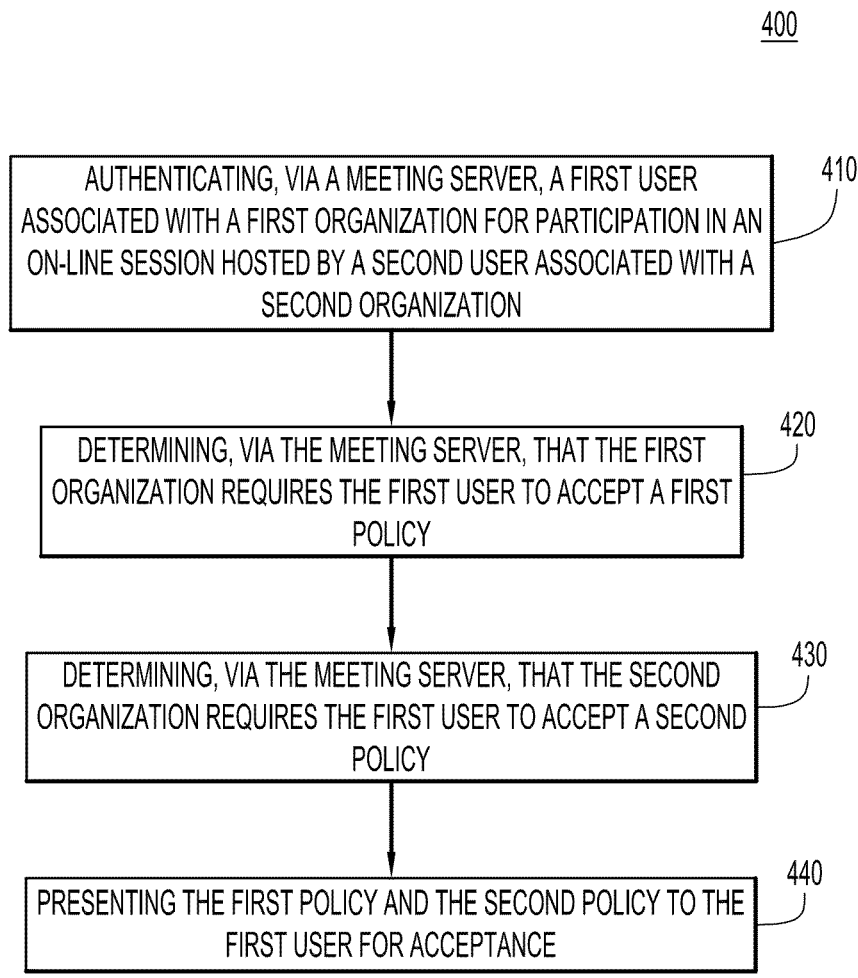
FIG. 4 is a flowchart illustrating a method of presenting policies for online sessions.

Reference is now made to FIG. 4. FIG. 4 illustrates a flowchart 400 depicting an example method of providing an online session to users associated with different organizations. The process begins in step 410 where a first user associated with a first organization is authenticated, via a meeting server, for participation in an online session hosted by (a second user associated with) a second organization. The user may be authenticated as described above in connection with steps 210 and/or 220 of FIG. 2.

In step 420 a determination is made via the meeting server that the first organization requires the first user to accept a first policy. This determination may be made as described above with reference to step 250 of FIG. 2. In step 430, a determination is made via the meeting server that the second organization requires the first user to accept a second policy. This determination may be made as described above with reference to step 255 of FIG. 2.

Finally, in step 440, the first policy and the second policy are presented to the first user for acceptance. The presenting of the first and second policies to the user may be made as described above in connection with step 260 of FIG. 2.

Figure 5:
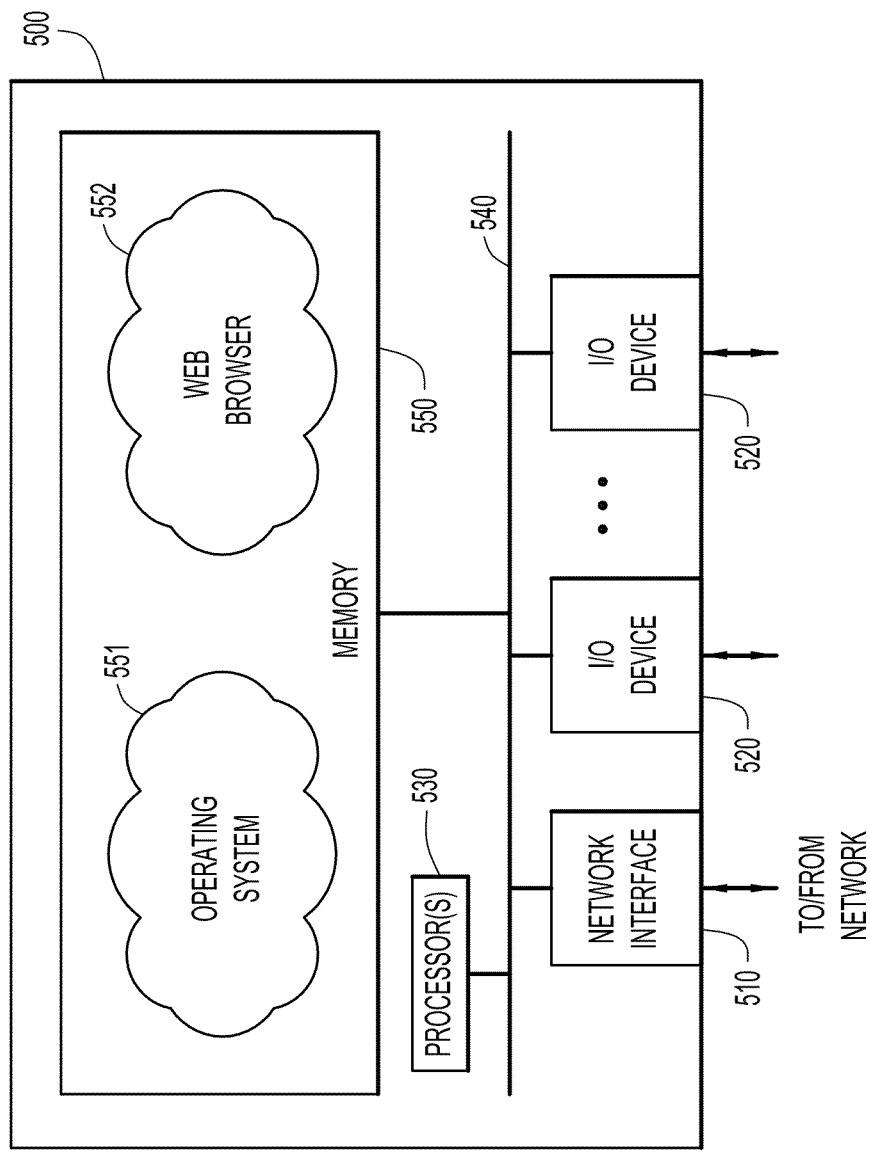
FIG. 5 is a block diagram illustrating an example apparatus configured to accept and join an online session.

Turning to FIG. 5, depicted therein is an example block diagram of an endpoint apparatus 500 configured to access an online session in accordance with the techniques described herein. The apparatus 500 comprises network interface unit 510, input/output (I/O) devices 520, processor 530, bus 540, and memory 550. The memory 550 comprises software instructions for operating system 551 as well as other applications such as a web browser 552. A user interacts with the apparatus 500 through I/O device 520, which may include displays, keyboards, mice, touch screens, video cameras, microphones, and other devices that allow the user to accept policies and interact in an online session as described above.

Memory 550 may comprise read only memory (ROM), random access memory (RAM), magnetic disk storage media devices, optical storage media devices, flash memory devices, electrical, optical, or other physical/tangible (e.g., non-transitory) memory storage devices. The processor 530 is, for example, a microprocessor or microcontroller that executes instructions for the operating system 541. Thus, in general, the memory 550 may comprise one or more tangible (non-transitory) computer readable storage media (e.g., a memory device) encoded with software comprising computer executable instructions and when the software is executed (by the processor 530) it is operable to perform the operations described herein in connection with FIGS. 1-4.

Figure 6:
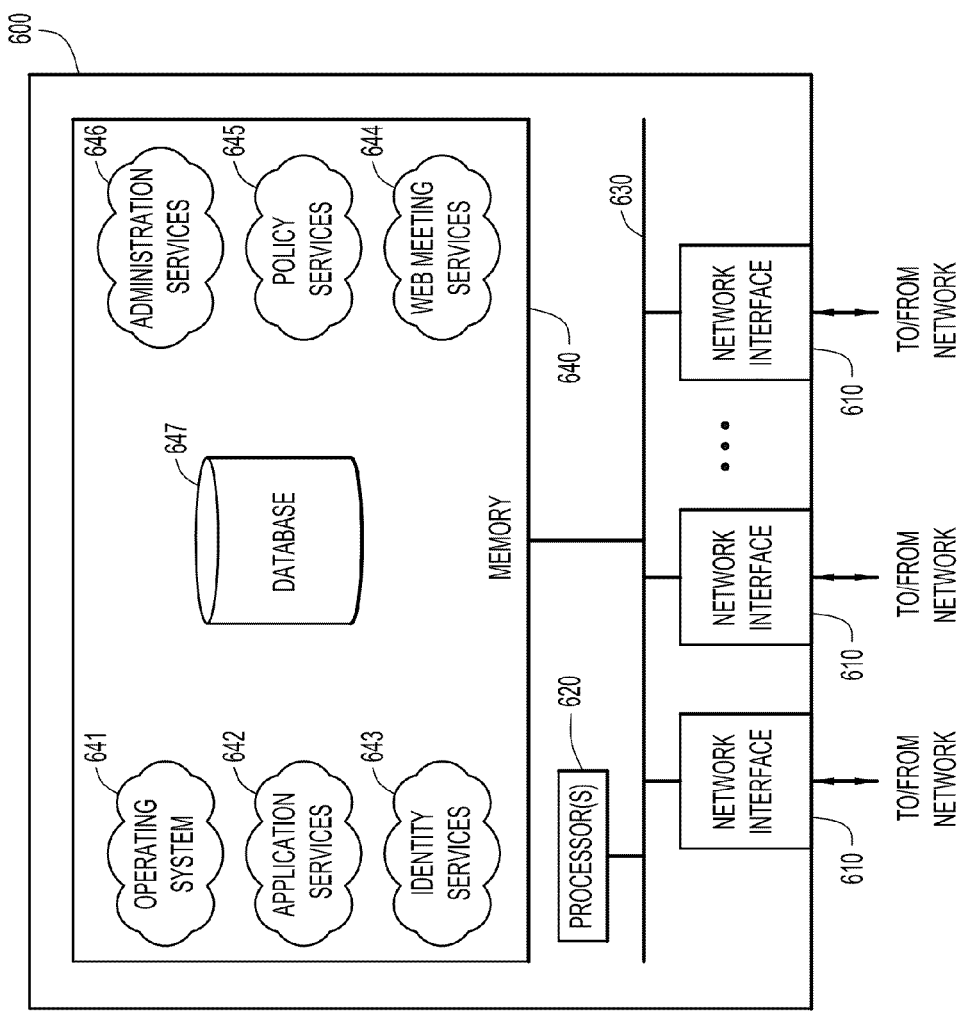
FIG. 6 is a block diagram illustrating an example apparatus for hosting an online session, and configured to present and receive acceptance of policies required to join the online session.

With reference now made to FIG. 6, depicted therein is an example block diagram of an apparatus 600 configured to serve an online session in accordance with the techniques described herein. The apparatus 600 may perform the functions of the meeting server 110 shown in FIG. 1, and therefore, apparatus 600 may be embodied in a single server, or distributed across multiple servers and/or data centers. The apparatus 600 comprises network interfaces 610, processor 620, bus 630, and memory 640. The memory 640 stores software instructions for operating system 651, application services 642, identity services 643, web meeting services 644, policy services 645, and administrative services 646. Database 647 may store data for user profiles, policies, administrative profiles, and other information used to carry out the online session services described herein.

Memory 640 may comprise read only memory (ROM), random access memory (RAM), magnetic disk storage media devices, optical storage media devices, flash memory devices, electrical, optical, or other physical/tangible (e.g., non-transitory) memory storage devices. The processor 620 is, for example, a microprocessor or microcontroller that executes instructions for the services stored in memory 640. Thus, in general, the memory 640 may comprise one or more tangible (non-transitory) computer readable storage media (e.g., a memory device) encoded with software comprising computer executable instructions and when the software is executed (by the processor 620) it is operable to perform the operations described herein in connection with FIGS. 1-4.

The foregoing techniques facilitate cross-organizational collaboration. The meeting server brokers presentation of all legal terms, so that no relationship between organizations needs to exist. Thus, the focus can be on real-time collaboration.

The above description is intended by way of example only.

What is claimed is:

1. A method comprising:
   authenticating, via a processor of a meeting server, a user who is a member of a first organization for participation in an online real-time collaborative session between the user and at least one other user, wherein the online real-time collaborative session is hosted by a second organization, and wherein the user is not a member of the second organization;
   determining, via the processor of the meeting server, that the first organization requires members of the first organization to accept a first policy when attending online real-time collaborative sessions hosted by the first organization;
   determining, via the processor of the meeting server, that the second organization requires members of the second organization to accept a second policy when attending online real-time collaborative sessions hosted by the second organization;
   retrieving, from a database, the first policy in response to the user being a member of the first organization;
   retrieving, from the database, the second policy in response to the user authenticating to the online collaborative session hosted by the second organization; and
   presenting, via the processor of the meeting server, the first policy and the second policy to the user for acceptance, wherein the database stores policies for the first organization and the second organization, and
   wherein the database is maintained by a third organization.

2. The method of claim 1, wherein presenting the first policy and the second policy comprises simultaneously displaying information for the first policy and the second policy.

3. The method of claim 1, further comprising receiving acceptance of the user to the first policy and second policy, and granting the user access to the online real-time collaborative session in response to receiving an acceptance of the first policy and the second policy.

4. The method of claim 3, wherein receiving acceptance for the first policy and the second policy comprises receiving a single acceptance for both the first policy and the second policy.

5. The method of claim 1, wherein presenting the first policy and the second policy comprises displaying terms of service for at least one of the first organization or the second organization.

6. The method of claim 1, wherein presenting the first policy and the second policy comprises displaying a privacy policy for at least one of the first organization or second organization.

7. The method of claim 1, wherein presenting the first policy and the second policy comprises displaying a non-disclosure agreement for at least one of the first organization or second organization, wherein the non-disclosure agreement prohibits disclosure of contents of the online real-time collaborative session.

8. The method of claim 1, wherein determining that the first organization requires acceptance of the first policy and determining that the second organization requires acceptance of the second policy comprises querying the database that stores policy information for the first organization and for the second organization.

9. The method of claim 1, further comprising:
   receiving the first policy from a first administrator associated with the first organization; and
   receiving the second policy from a second administrator associated with the second organization.

10. An apparatus comprising:
    a network interface unit configured to enable communications over a network;

a memory, wherein the memory stores a database including information for policies for a first organization and a second organization and that is maintained by a third organization; and a processor coupled to the network interface unit and the memory, wherein the processor is configured to:
query the memory to authenticate a user who is a member of the first organization for participation in an online real-time collaborative session hosted by the second organization, wherein the user is not a member of the second organization;
determine that the first organization requires members of the first organization to accept a first policy when attending online real-time collaborative sessions hosted by the first organization;
determine that the second organization requires members of the second organization to accept a second policy when attending online real-time collaborative sessions hosted by the second organization;
retrieve, from the database, the first policy in response to the user being a member of the first organization;
retrieve, from the database, the second policy in response to the user authenticating to the online collaborative session hosted by the second organization; and
present, over the network interface unit, the first policy and the second policy to the user for acceptance.

11. The apparatus of claim 10, wherein the processor is configured to simultaneously present the first policy and the second policy to the user.

12. The apparatus of claim 10, wherein the processor is further configured to cause the processor to grant the user access to the online real-time collaborative session in response to receiving from the user an acceptance of the first policy and the second policy over the network interface unit.

13. The apparatus of claim 10, wherein the processor is further configured to query the database of the third organization.

14. A tangible, non-transitory, computer readable medium encoded with instructions that when executed by a processor cause the processor to:
authenticate a user who is a member of a first organization for participation in an online real-time collaborative session hosted by a second organization, wherein the user is not a member of the second organization;
determine that the first organization requires members of the first organization to accept a first policy when attending online real-time collaborative sessions hosted by the first organization;
determine that the second organization requires members of the second organization to accept a second policy when attending online real-time collaborative sessions hosted by the second organization;
retrieve the first policy from a database in response to the user being a member of the first organization, and retrieve the second policy from the database in response to the user authenticating to the online collaborative session hosted by the second organization, wherein the database stores policies for the first organization and the second organization and wherein the database is maintained by a third organization; and
present the first policy and the second policy to the user for acceptance.

15. The computer readable medium of claim 14, wherein the instructions further cause the processor to simultaneously present the first policy and the second policy to the user.

16. The computer readable medium of claim 15, wherein the instructions further cause the processor to grant the user access to the online session in response to receiving from the user an acceptance of the first policy and the second policy.

17. The computer readable medium of claim 14, wherein the instructions further cause the processor to query the database that stores policy information for the first organization and the second organization.

18. The computer readable medium of claim 14, further comprising instructions that cause the processor to present the first policy and the second policy to the user for acceptance by displaying a non-disclosure agreement for at least one of the first organization or second organization, wherein the non-disclosure agreement prohibits disclosure of contents of the online real-time collaborative session.

19. The computer readable medium of claim 14, further comprising instructions that cause the processor to:
receive the first policy from a first administrator associated with the first organization; and
receive the second policy from a second administrator associated with the second organization.

20. The apparatus of claim 10, wherein the processor is configured to present the first policy and the second policy to the user for acceptance by displaying a non-disclosure agreement for at least one of the first organization or the second organization, wherein the non-disclosure agreement prohibits disclosure of contents of the online real-time collaborative session.

* * * * *

UNITED STATES PATENT AND TRADEMARK OFFICE
CERTIFICATE OF CORRECTION

| | | |
|---|---|---|
| PATENT NO. | : 9,237,140 B1 | Page 1 of 1 |
| APPLICATION NO. | : 13/788638 | |
| DATED | : January 26, 2016 | |
| INVENTOR(S) | : Lerner et al. | |

It is certified that error appears in the above-identified patent and that said Letters Patent is hereby corrected as shown below:

On the Title page, item (73) Assignee: Replace "Cisco Technologies, Inc." with -- Cisco Technology, Inc. --.

Signed and Sealed this
Tenth Day of May, 2016

Michelle K. Lee
*Director of the United States Patent and Trademark Office*